Sept. 7, 1943.     N. D. COLVIN     2,328,617
TRACTOR MOWER
Filed Aug. 31, 1942     2 Sheets-Sheet 1

FIG. I

INVENTOR
NOLAN D. COLVIN
BY
ATTORNEYS

Sept. 7, 1943.　　　N. D. COLVIN　　　2,328,617
TRACTOR MOWER
Filed Aug. 31, 1942　　　2 Sheets-Sheet 2
FIG. 2
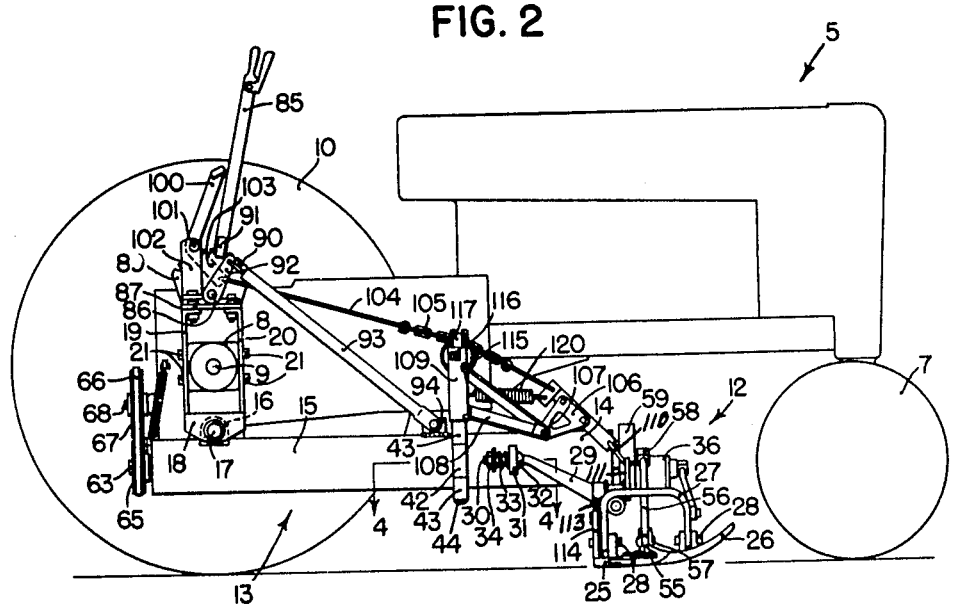
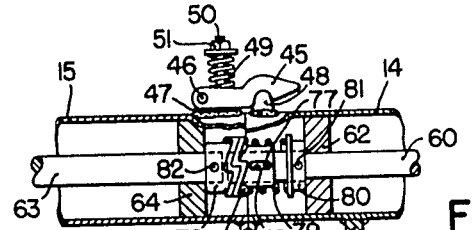
FIG. 4
FIG. 3
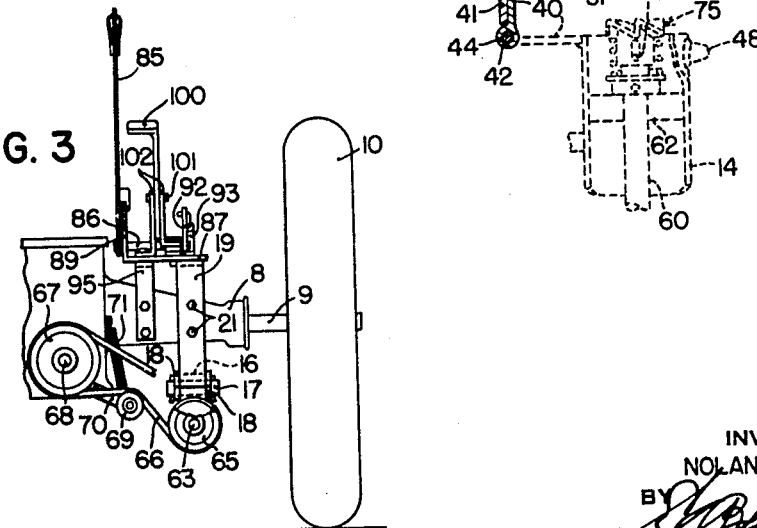
INVENTOR
NOLAN D. COLVIN
BY
ATTORNEYS Patented Sept. 7, 1943

2,328,617

UNITED STATES PATENT OFFICE 2,328,617

TRACTOR MOWER

Nolan D. Colvin, Moline, Ill., assignor to Deere & Company, Moline, Ill., a corporation of Illinois Application August 31, 1942, Serial No. 456,826

13 Claims. (Cl. 56—25)

The present invention relates to tractor mowers, and has for its principal object the provision of a novel and improved tractor mower of simplified construction, but which is strong and durable and efficient in operation.

According to the present invention, the mower frame constitutes a pair of tubular members disposed end to end in axial alignment and hinged together, the two sections being releasably held by latch mechanism in axially aligned position. This tubular supporting member is pivotally carried at its rear end on the tractor axle housing and supports, at its front end, the cutting apparatus, and the driving mechanism for the cutting apparatus extends through the tubular support and is driven from the tractor engine by connecting means at the rear of the tubular member.

These and other objects and advantages of my invention will be apparent to those skilled in the art after a consideration of the following description, in which reference is had to the drawings appended hereto, in which:

Figure 1 is a plan view of a tractor mower embodying the principles of my invention, in which the mower is shown in solid lines in its normal operating position, while in dotted lines is shown the position of the cutter bar after it has encountered an obstruction in the field during operation, releasing the latch mechanism and allowing the forward section of the tubular frame to hinge about the connection to permit the cutter bar to trail rearwardly to clear the obstruction;

Figure 2 is a side elevational view of the mower;

Figure 3 is a rear elevational view showing a portion of the tractor and the mower mounted thereon; and Figure 4 is a sectional plan view taken along a line 4—4 in Figure 2 and drawn to an enlarged scale.

Figure 1:
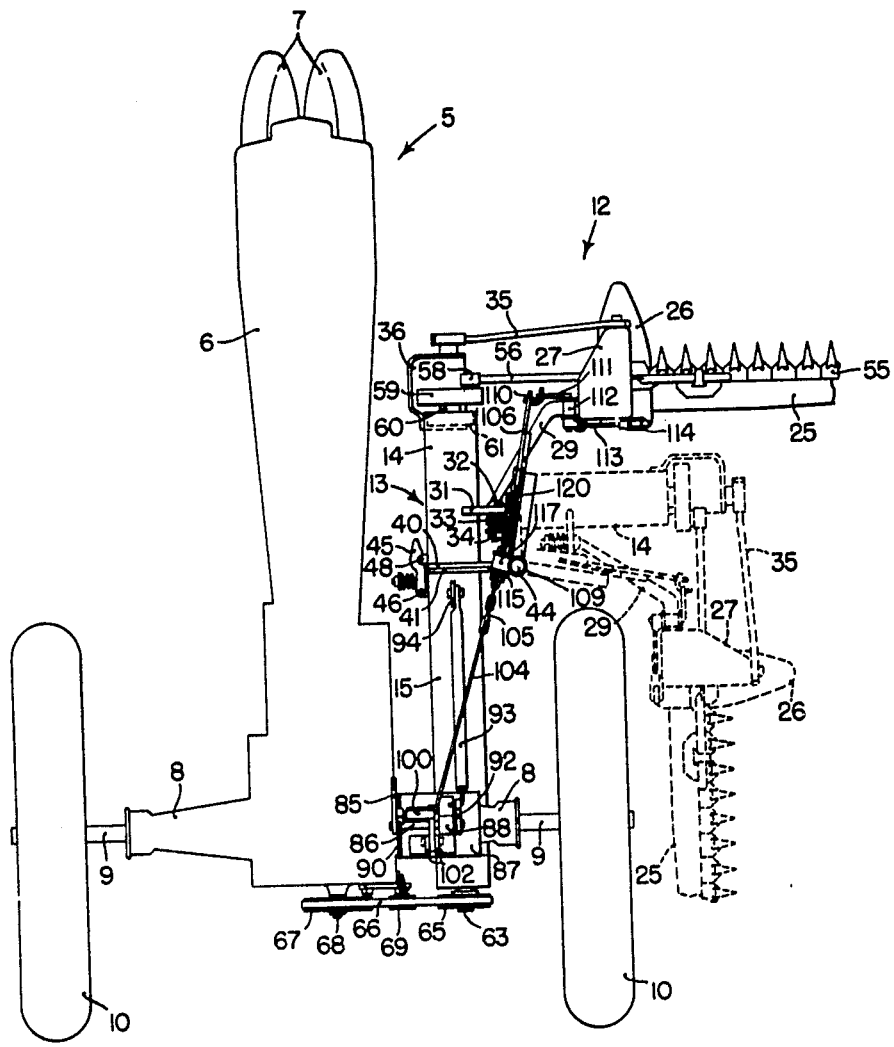

Referring now to the drawings, the tractor 5, which is indicated in outline as a conventional tractor of the tricycle type, comprises a narrow longitudinally extending body 6, within which is disposed the usual engine and transmission mechanism (not shown). The forward end of the body is supported on a dirigible wheel support including a pair of closely spaced wheels 7, well-known to those skilled in the art. The rear end of the body is provided with a pair of laterally extending axle housings 8, within which are journaled a pair of axles 9 carried on traction wheels 10. In Figure 2 the near traction wheel is removed to more clearly show the details of the mower construction.

The mower is indicated in its entirety by reference numeral 12 and comprises a main tubular supporting arm 13 consisting of a pair of front and rear sections 14, 15 of pipe, disposed in axial alignment with each other and connected together by means which will be described.

The tubular supporting arm 13 is disposed longitudinally of the tractor between the body 6 and one of the rear traction wheels 10 and is provided with an upstanding lug 16, rigidly secured as by welding, to the rear pipe section 15 near the rear end thereof. The lug 16 is transversely apertured to receive a pivot pin 17, which is supported in a transverse position beneath the rear axle housing 8, in a pair of laterally spaced, longitudinally extending vertical plates 18, the latter being rigidly supported on a pair of vertical bracket members 19, 20, which are secured by bolts 21 to the front and rear sides of the tractor axle housing at those points which are conventionally provided with tapped openings to receive bolts for the purpose of supporting implements, as is well-known to those skilled in the art. The pivot pin 17 thus extends transversely through aligned aperatures in the lug 16 and the supporting plates 18, providing for vertical swinging movement of the supporting arm 13 about the axis of the pin 17.

The mower 12 includes a cutter bar 25 which, in normal operating position, is disposed transversely of the direction of travel, ahead of one of the rear traction wheels 10 and outside the plane of rotation thereof. The cutter bar is attached to a shoe 26 at its inner end, and the shoe 26 is pivotally mounted on the usual shoe arch 27 on a pair of fore and aft aligned pivot bolts 28, thus providing for vertical swinging movement of the cutter bar in a transverse plane about the axis of the bolts 28. The shoe arch 27 is mounted on the outer end of an angular supporting arm 29, which extends inwardly and rearwardly from the shoe arch and has a rearwardly directed spindle portion 30 at its inward end, the latter being inserted through an aperture in a transversely disposed ear 31, which is rigidly secured as by welding to the forward pipe section 14 of the arm 13 at a point near the rear end of the section 14. The arm 29 is enlarged at 32 to provide a shoulder, which bears against the forward face of the ear 31, and is held in contact with the latter by means of a spring 33, which encircles the spindle portion 30 behind the ear 31 and reacts against a nut 34, the latter being mounted on the rear end of the spindle portion 30, which is threaded to receive the same. Thus, the cutter bar can move vertically relative to the supporting arm 13 by virtue of the angular supporting arm 29 which is swingably mounted on the ear 31, for vertical movement about the longitudinally extending axis of the spindle portion 30. The forward end of the shoe arch 27 is connected by a transversely extending link 35 to a flywheel guard casting 36, which is mounted on the forward end of the front pipe section 14, the link 35 being pivotally mounted at opposite ends, respectively, on the arch 27 and casting 36.

The two pipe sections 14, 15 are hinged together by means of a pair of hinge plates 40, 41, respectively, which are rigidly fixed to the adjoining ends of the pipe sections and are provided with tubular bearing portions 42, 43, respectively, at the outer ends of the plates 40, 41. The bearing portions 42, 43 are aligned vertically to receive a vertical hinge bolt 44 spaced laterally outwardly from the supporting arm 13. Thus, the forward pipe section 14 is swingable relative to the rear pipe section 15 about the vertical axis of the hinge bolt 44, and since the latter is spaced inwardly of the tractor wheel 10 and rearwardly of the cutter bar 25, the front pipe section 14 can swing laterally through an angle of approximately ninety degrees to the dotted line position shown in Figure 1 in which the section 14 extends transversely in front of the tractor wheel 10 and the cutter bar trails rearwardly outside the wheel 10. The cutter bar and its associated tubular supporting arm section 14 are releasably held in normal operating position by means of a latch 45, which is pivoted to a lug 47 by means of a vertically disposed pivot pin 46. The lug 47 is rigidly welded to the forward end of the rear pipe section 15. The forward end of the latch 45 engages a cooperative lug 48, which is securely welded to the rear end of the forward pipe section 14, and the latch is releasably held in engagement therewith by means of a compression spring 49, which encircles a bolt 50, the latter being attached to the latch supporting lug 47. The spring 49 acts against the outer side of the lug 45 and reacts against a nut 51 threaded on the end of the bolt 50, and by adjusting the nut 51 on the bolt 50, the pressure of the spring 49 can be adjusted to control the amount of force necessary to release the latch mechanism. Thus, it is evident that when the cutter bar 25 engages an obstruction in the field during operation, the forward momentum of the tractor causes the cutter bar and its supporting pipe section 14 to swing rearwardly about the hinge bolt 44, breaking open the latch and allowing the cutter bar to trail to the position shown in dotted lines. By virtue of the position of the hinge bolt 44 behind the shoe 26, the latter is provided with an appreciable amount of rearward movement, which is sufficient to enable the tractor operator to stop the tractor before appreciable damage is done to the cutter bar or its supporting structure. Cutting apparatus in the form of a reciprocative sickle 55 is mounted on the cutter bar 25 and cooperates therewith to sever the crops during operation. The sickle 55 is reciprocative by means of a pitman 56 connected thereto through a ball and socket joint 57 and extending transversely inwardly to a bearing 58 journaled on a crank which is fixed to a flywheel 59. The flywheel 59 is mounted on the forward end of a drive shaft 60, which extends through the forward arm section 14 and substantially coaxial therewith. The shaft 60 is journaled in a pair of front and rear spaced bearings 61, 62 mounted within the pipe section 14. A second drive shaft 63 is rotatably disposed substantially coaxially within the rear pipe section 15 and is journaled in suitable longitudinally spaced bearings 64. The rear end of the drive shaft 63 extends rearwardly beyond the end of the pipe section 15 to receive a drive pulley 65, which receives power through a flexible belt 66 from a pulley 67 mounted on the power take-off shaft 68 of the tractor. A belt tightener pulley 69 is mounted on an arm 70 which is pivotally supported on the axle housing 8 and is urged by means of a coil spring 71 into contact with the lower side of the belt.

The two adjoining ends of the shafts 60, 63 adjacent the hinge connection between the pipe sections 14, 15, are separably coupled by means of a pair of jaw clutch elements 75, 76. The clutch element 75 on the forward shaft 60 is slidable axially relative thereto, but is held against rotation relative to the shaft 60 by means of a pin 77 held rigidly in the shaft 60 and extending through a longitudinal slot 78 in the clutch element 75. A coil spring 79 encircles the hub of the clutch element 75 and urges the latter rearwardly into clutching engagement with the element 76, and reacts against a thrust collar 80 which is fixed to the shaft 60 by means of a pin 81. The clutch element 76 is fixed to the forward end of the rear shaft section 63 by means of a pin 82. When the cutter bar encounters an obstruction during operation and releases the latch 45 to swing into trailing position, the shaft 60 in the forward section 14 swings laterally with the latter, and the clutch element 75 is retained on the shaft 60 by the pin 77, as indicated in dotted lines in Figure 4. When the cutter bar is returned to its normal operating position, the clutch elements 75, 76 are moved into engagement, but if they do not immediately mesh properly, no damage is done, for the element 75 merely slides on the shaft 60 and is returned to meshing engagement by the spring 79.

The tubular supporting arm 13 is angularly adjusted about the transverse axis of the supporting pivot pin 17 by means of a hand lever 85 fixed to a rockshaft 86, which is disposed transversely above the rear axle housing 8 and supported on a horizontal plate 87, which is bolted to the upper ends of the brackets 19, 20, the latter being extended above the axle housing for this purpose. The rockshaft is journaled in a bearing block 88 and in a vertical plate 89, which is rigidly mounted on the horizontal plate 87. The upper edge of the plate 89 is curved in an arc about the rockshaft as a center and is notched as at 90 to provide means for securing the lever 85 in adjusted position through a latch mechanism 91 on the lever. An arm 92 is fixed to the outer end of the rockshaft 86, the outer end of the arm 92 being connected through a link 93 to a lug 94 welded to the top of the rear pipe section 15 adjacent the forward end thereof. Thus, by means of the lever 85 the forward end of the supporting arm 13 can be raised or lowered to adjust the height of the mower cutter bar 25 for the purpose of cutting the grass along a curbing or the like.

The inner end of the supporting plate 87 is carried on a pair of brackets 95, which are supported on the front and rear sides of the axle housing 8, inwardly of the previously mentioned brackets 19, 20.

Normally, the cutter bar floats along the ground during operation, but can be lifted to avoid an obstruction or to transport the mower, by means of a foot lever 100, pivoted on a bolt 101 supported on a pair of brackets 102, which are mounted on the supporting plate 87. The foot lever 100 has a downwardly and forwardly extending arm 103, to which is conncected a rod 104, the forward end of which is connected through a chain 105 to a bell crank 106 swingably mounted for vertical movement about a pivot bolt 107 on a bracket 108, which is welded to a vertically disposed sleeve member 109, which is journaled on the upper portion of the hinge bolt 44. The forward end of the bell crank 106 is connected through a link 110 to one arm of a bell crank 111 which is journaled in a fore and aft extending bearing 112 for swinging movement about a fore and aft extending axis. The other arm of the bell crank 111 is connected through a link 113 to a vertical arm 114, which is rigidly fixed to the rear end of the mower shoe 26. The chain 105 is trained over a sheave 115, which is rotatably supported on a bolt 116 on the upper end of the sleeve 109. A retainer 117 holds the chain in engagement with the sheave 115.

When the operator steps on the foot lever 100, the lower portion 103 pulls the rod 104 and chain 105 rearwardly to swing the bell crank 106 upwardly, the latter acting through the link 110 to swing the bell crank arm 111 upwardly and thus pulling the link 113 inwardly toward the tractor. This exerts a force against the vertical arm 114 thereby tending to swing the outer end of the cutter bar upwardly. A counterbalancing spring 120 is connected between the sleeve 109 and the bell crank 106 and urges the latter upwardly and thus tends to hold the cutter bar generally horizontal during operation, although allowing the latter to float along the ground.

I claim:

1. A mower for a tractor having a narrow longitudinally extending body carried on a transverse axle housing and a wheel journaled at the end of said housing, comprising a longitudinally disposed primary supporting arm swingably mounted on said axle housing by means providing for vertical swinging movement about a generally transverse axis, a secondary arm swingably mounted at the end of said primary arm by means providing for lateral swinging movement about a generally vertical axis, a cutter bar mounted on said secondary arm and extending transversely thereof ahead of said tractor wheel, and releasable latch means connecting said arms and holding them noramlly rigid relative to each other.

2. A mower for a tractor having a narrow longitudinally extending body carried on a transverse axle housing and a wheel journaled at the end of said housing, comprising a longitudinally disposed primary supporting arm swingably mounted on said axle housing by means providing for vertical swinging movement about a generally transverse axis, a secondary arm swingably mounted at the end of said primary arm by means providing for lateral swinging movement about a generally vertical axis, a cutter bar mounted on said secondary arm and extending transversely thereof ahead of said tractor wheel, a pair of longitudinally disposed adjoining power shafts journaled on said arms, respectively, joint means interconnecting the adjoining ends of said shafts, a driving connection adjacent the opposite end of said primary arm for driving the associated shaft, cutting mechanism on said cutter bar, means connecting said cutting mechanism with the shaft on said secondary arm, and releasable latch means connecting said arms and holding them normally rigid relative to each other.

3. A mower for a tractor having a narrow longitudinally extending body carried on a transverse axle housing and a wheel journaled at the end of said housing, comprising a longitudinally disposed primary supporting arm swingably mounted on said axle housing by means providing for vertical swinging movement about a generally transverse axis, a secondary arm swingably mounted at the end of said primary arm by means providing for lateral swinging movement about a generally vertical axis, a cutter bar mounted on said secondary arm and extending transversely thereof ahead of said tractor wheel, a pair of aligned power shafts journaled on said arms, respectively, separable means for coupling the adjoining ends of said shafts, said means being disengageable when said secondary arm swings relative to said primary arm, a driving connection adjacent the opposite end of said primary arm for driving the associated shaft, cutting mechanism on said cutter bar, means connecting said cutting mechanism with the shaft on said secondary arm, and releasable latch means connecting said arms and holding them normally rigid relative to each other.

4. A mowing implement comprising a tractor having a narrow longitudinally extending body carried on a transverse axle housing and a wheel journaled at the end of said housing, a supporting arm pivotally supported at its rear end beneath said axle housing for vertical swinging movement and extending forwardly between the tractor body and wheel, a lever mounted on said tractor and having a connection to said arm, a drive shaft disposed longitudinally of said arm and journaled thereon, cutting apparatus mounted on the forward end of said arm and operatively connected with the forward end of said drive shaft, and means at the rear of said arm for connecting said shaft with the tractor engine.

5. A mowing implement comprising a tractor having a narrow longitudinally extending body carried on a transverse axle housing and a wheel journaled at the end of said housing, a supporting arm pivotally supported at its rear end beneath said axle housing for vertical swinging movement and extending forwardly between the tractor body and wheel, said arm comprising a front and rear section hinged together by means providing for lateral swinging movement of said forward section from a forwardly extending normal operating position to a transverse position in front of said tractor wheel, a lever mounted on said tractor and having a connection to said arm, a drive shaft disposed longitudinally of said arm and journaled thereon, cutting apparatus mounted on the forward end of said arm and operatively connected with the forward end of said drive shaft, and means at the rear of said arm for connecting said shaft with the tractor engine.

6. A mowing implement comprising a tractor having a narrow longitudinally extending body carried on a transverse axle housing and a wheel journaled at the end of said housing, a supporting arm pivotally supported at its rear end beneath said axle housing for vertical swinging movement and extending forwardly between the tractor body and wheel, said arm comprising a front and rear section hinged together by means providing for lateral swinging movement of said forward section from a forwardly extending normal operating position to a transverse position in front of said tractor wheel, a pair of longitudinally extending drive shafts journaled on said arm sections, respectively, cutting apparatus mounted on the forward end of said front section and operatively connected with the forward end of the associated drive shaft, means at the rear of said rear arm section for connecting the drive shaft associated therewith with the tractor engine, separable coupling means between the adjoining ends of said drive shafts, said means being disengageable when said front arm section swings laterally, and releasable latch means for normally retaining said front arm section in said normal operating position.

7. A mowing implement comprising a tractor having a narrow longitudinally extending body carried on a transverse axle housing and a wheel journaled at the end of said housing, a supporting arm pivotally supported at its rear end beneath said axle housing for vertical swinging movement and extending forwardly between the tractor body and wheel, said arm comprising a front and rear section hinged together by means providing for lateral swinging movement of said forward section from a forwardly extending normal operating position to a transverse position in front of said tractor wheel, a pair of longitudinally spaced, laterally extending links pivotally mounted on said front arm section for vertical swinging movement relative thereto, a cutter bar mounted on said links and disposed transversely ahead of said tractor wheel and outside of the latter, lever means mounted on the tractor and connected to said rear arm section to adjust the arm vertically about said pivot support, lever means mounted on the tractor and connected to said links and cutter bar to adjust the latter vertically, and latch means connected between said arm sections for normally retaining said front arm section and cutter bar in operating position.

8. A mowing implement comprising a tractor having a narrow longitudinally extending body carried on a transverse axle housing and a wheel journaled at the end of said housing, a supporting arm pivotally supported at its rear end beneath said axle housing for vertical swinging movement and extending forwardly between the tractor body and wheel, said arm comprising a front and rear section hinged together by means providing for lateral swinging movement of said forward section from a forwardly extending normal operating position to a transverse position in front of said tractor wheel, a pair of longitudinally spaced, laterally extending links pivotally mounted on said front arm section for vertical swinging movement relative thereto, a cutter bar mounted on said links and disposed transversely ahead of said tractor wheel and outside of the latter, a pair of longitudinally extending drive shafts journaled on said arm sections, respectively, a crank on the forward end of said front section drive shaft, a sickle cooperatively disposed on said cutter bar, a pitman connecting said sickle and said crank, means at the rear of said rear arm section for connecting the drive shaft associated therewith with the tractor engine, separable coupling means between the adjoining ends of said drive shafts, said means being disengageable when said front arm section swings laterally, and releasable latch means for normally retaining said front arm section in said normal operating position.

9. A mower for a tractor having a narrow longitudinally extending body carried on a transverse axle housing and a wheel journaled at the end of said housing, comprising a longitudinally disposed primary supporting arm comprising a length of pipe swingably mounted on said axle housing by means providing for vertical swinging movement about a transverse axis, a secondary arm comprising a length of pipe disposed in axial alignment at the end of said primary arm and hingedly supported thereon by means providing for lateral swinging movement about a generally vertical axis, a cutter bar mounted on said secondary arm and extending transversely thereof ahead of said tractor wheel, and releasable latch means connecting said arms and holding them normally rigid relative to each other.

10. A mower for a tractor having a narrow longitudinally extending body carried on a transverse axle housing and a wheel journaled at the end of said housing, comprising a longitudinally disposed primary supporting arm comprising a length of pipe swingably mounted on said axle housing by means providing for vertical swinging movement about a transverse axis, a secondary arm comprising a length of pipe disposed in axial alignment at the end of said primary arm and hingedly supported thereon by means providing for lateral swinging movement about a generally vertical axis, a cutter bar mounted on said secondary arm and extending transversely thereof ahead of said tractor wheel, a pair of adjoining power shafts rotatably disposed within said pipes, respectively, joint means interconnecting the adjoining ends of said shafts, a driving connection at the opposite end of said primary arm for driving the associated shaft, cutting mechanism on said cutter bar, means connecting said cutting mechanism with the shaft in said secondary arm, and releasable latch means connecting said arms and holding them in axially aligned position.

11. A mower for a tractor having a narrow longitudinally extending body carried on a transverse axle housing and a wheel journaled at the end of said housing, comprising a longitudinally disposed primary supporting arm comprising a length of pipe swingably mounted on said axle housing by means providing for vertical swinging movement about a transverse axis, a secondary arm comprising a length of pipe disposed in axial alignment at the end of said primary arm and hingedly supported thereon by means providing for lateral swinging movement about a generally vertical axis, a cutter bar mounted on said secondary arm and extending transversely thereof ahead of said tractor wheel, a pair of aligned power shafts journaled within said lengths of pipe, respectively, separable means for coupling the adjoining ends of said shafts within said arms, said means being disengageable at the adjoining ends of the arms when said secondary arm swings relative to said primary arm, a driving connection at the opposite end of said primary arm for driving the associated shaft, cutting mechanism on said cutter bar, means connecting said cutting mechanism with the shaft in said secondary arm, and releasable latch means connecting said arms and holding them in axially aligned position.

12. A mowing implement comprising a tractor having a narrow longitudinally extending body carried on a transverse axle housing and a wheel journaled at the end of said housing, a tubular supporting arm pivotally supported at its rear end beneath said axle housing for vertical swinging movement and extending forwardly between the tractor body and wheel, a lever mounted on said tractor and having a connection to said arm, a drive shaft disposed generally coaxially within said arm and journaled therein, cutting apparatus mounted on the forward end of said tubular arm, said shaft extending through the forward end of the arm and having a connection with said cutting apparatus, and means at the rear end of said arm connecting the rear end of said shaft with the tractor engine.

13. A mowing implement comprising a tractor having a narrow longitudinally extending body carried on a transverse axle housing and a wheel journaled at the end of said housing, a tubular supporting arm pivotally supported at its rear end beneath said axle housing for vertical swinging movement and extending forwardly between the tractor body and wheel, said arm comprising a pair of front and rear tubular sections disposed in axial alignment and hinged together for lateral swinging movement of said forward section from a forwardly extending normal operating position to a transverse position in front of said tractor wheel, a lever mounted on said tractor and having a connection to said arm, a drive shaft disposed generally coaxialy within said arm and journaled therein, said shaft comprising a pair of sections corresponding to the tubular arm sections, separable means between the adjoining ends of said shaft sections adapted to disengage when said arm sections are swung out of alignment, cutting apparatus mounted on the forward end of said arm and having a driving connection with the forward end of said shaft, means connecting the rear end of said shaft with the tractor engine, and releasable latch means connecting said arms and holding them normally rigid relative to each other.

NOLAN D. COLVIN.